US012700415B2

United States Patent
(12) United States Patent
Sautiere et al.

(10) Patent No.: US 12,700,415 B2
(45) Date of Patent: Aug. 4, 2026

(54) AUDIO CODING USING MACHINE LEARNING BASED LINEAR FILTERS AND NON-LINEAR NEURAL SOURCES

(71) Applicant: QUALCOMM Incorporated, San Diego, CA (US)

(72) Inventors: Guillaume Konrad Sautiere, Amsterdam (NL); Duminda Dewasurendra, San Diego, CA (US); Zisis Iason Skordilis, San Diego, CA (US); Vivek Rajendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 18/689,053

(22) PCT Filed: Oct. 10, 2022

(86) PCT No.: PCT/US2022/077864
§ 371 (c)(1),
(2) Date: Mar. 4, 2024

(87) PCT Pub. No.: WO2023/064735
PCT Pub. Date: Apr. 20, 2023

(65) Prior Publication Data

US 2024/0428813 A1 Dec. 26, 2024

(30) Foreign Application Priority Data

Oct. 14, 2021 (GR) .............................. 20210100697

(51) Int. Cl.
*G10L 19/12* (2013.01)
*G10L 19/08* (2013.01)
(Continued)

(52) U.S. Cl.
CPC .............. *G10L 19/12* (2013.01); *G10L 19/08* (2013.01); *G10L 25/24* (2013.01); *G10L 25/30* (2013.01)

(58) Field of Classification Search
CPC ......... G10L 19/08; G10L 19/12; G10L 19/16; G10L 2019/0011; G10L 25/30
See application file for complete search history.

(56) References Cited

U.S. PATENT DOCUMENTS 11,295,751 B2 * 4/2022 Yu ........................ G10L 19/0208
2002/0052734 A1 * 5/2002 Unno ...................... G10L 19/10 704/207

(Continued)

FOREIGN PATENT DOCUMENTS

WO 2020145472 A1 7/2020

OTHER PUBLICATIONS

Valin, Jean-Marc, and Jan Skoglund. "LPCNet: Improving neural speech synthesis through linear prediction." ICASSP 2019-2019 IEEE International Conference on Acoustics, Speech and Signal Processing (ICASSP). IEEE, 2019.*

(Continued)

*Primary Examiner* — Shaun Roberts
(74) *Attorney, Agent, or Firm* — QUALCOMM Incorporated; Espartaco Diaz Hidalgo

(57) ABSTRACT

Systems and techniques are described for coding audio signals. For example, a voice decoder can generate, using a first neural network, an excitation signal for at least one sample of an audio signal at least in part by performing a non-linear operation based on one or more inputs to the first neural network, the excitation signal being configured to excite a learned linear filter. The voice decoder can further generate, using the learned linear filter and the excitation signal, at least one sample of a reconstructed audio signal.
(Continued)

For example, a second neural network can be used to generate coefficients for one or more learned linear filters, which receive as input the excitation signal generated by the first neural network trained to perform the non-linear operation.

30 Claims, 6 Drawing Sheets

(51) Int. Cl.
*G10L 25/24* (2013.01)
*G10L 25/30* (2013.01)

(56) References Cited

U.S. PATENT DOCUMENTS

| | | | | |
|---|---|---|---|---|
| 2002/0120438 | A1* | 8/2002 | Lin | G10L 19/12 704/207 |
| 2011/0295598 | A1* | 12/2011 | Yang | G10L 21/038 704/205 |
| 2012/0095758 | A1* | 4/2012 | Gibbs | G10L 21/038 704/219 |
| 2021/0074308 | A1 | 3/2021 | Skordilis et al. | |
| 2021/0090584 | A1* | 3/2021 | Yu | G10L 19/16 |
| 2021/0193112 | A1* | 6/2021 | Cui | G06N 3/0442 |
| 2021/0366461 | A1* | 11/2021 | Ahmed | G10L 15/16 |
| 2022/0358904 | A1* | 11/2022 | Mandel | G10L 13/047 |
| 2023/0016637 | A1* | 1/2023 | Schmidt | G06N 3/045 |
| 2023/0215420 | A1* | 7/2023 | Yu | G10L 25/30 704/259 |
| 2024/0127832 | A1* | 4/2024 | Ahmed | G06N 3/0464 |
| 2024/0428814 | A1 | 12/2024 | Dewasurendra | |

OTHER PUBLICATIONS

Valin, Jean-Marc, and Jan Skoglund. "A real-time wideband neural vocoder at 1.6 kb/s using LPCNet." arXiv preprint arXiv: 1903.12087 (2019).*

Ai, Yang, Hong-Chuan Wu, and Zhen-Hua Ling. "SampleRNN-based neural vocoder for statistical parametric speech synthesis." 2018 IEEE International Conference on Acoustics, Speech and Signal Processing (ICASSP). IEEE, 2018.*

Wang, Xin, Shinji Takaki, and Junichi Yamagishi. "Neural source-filter-based waveform model for statistical parametric speech synthesis." ICASSP 2019-2019 IEEE International Conference on Acoustics, Speech and Signal Processing (ICASSP). IEEE, 2019.*

Eunwoo S., et al., "ExcitNet Vocoder: A Neural Excitation Model for Parametric Speech Synthesis Systems", 2019 27th European Sihnal Processing Conference (EUSIPCO), EURASIP, Sep. 6, 2019 (Sep. 6, 2019), pp. 1-5, XP033660251, DOI: 10.23919/EUSIPC0.2019.8902701 abstract figure 2(c) section III. B. Speech Synthesis Using ExcitNet Vocoder.

International Search Report and Written Opinion—PCT/US2022/077864—ISA/EPO—Dec. 9, 2022.

Vadim P., et al., "Gaussian Lpcnet for Multisample Speech Synthesis", ICASSP 2020—2020 IEEE International Conference on Acoustics, Speech and Signal Processing (ICASSP), IEEE, May 4, 2020, pp. 6204-6208, XP033792958, DOI: 10.1109/ICASSP40776.2020.9053337 [Retrieved on Apr. 1, 2020] p. 6204, Right-Hand Column, Paragraph 1.

Song E., et al., "Effective Spectral and Excitation Modeling Techniques for LSTM-RNN-Based Speech Synthesis Systems", ARXIV:1806.04885V2, IEEE/ACM Transactions on Audio, Speech, and Language Processing, vol. 25, No. 11, Nov. 1, 2017, pp. 2152-2161, XP058381845.

* cited by examiner

AUDIO CODING USING MACHINE LEARNING BASED LINEAR FILTERS AND NON-LINEAR NEURAL SOURCES

CROSS-REFERENCE TO RELATED APPLICATIONS

This application for Patent is a 371 of international Patent Application PCT/US2022/077864, filed Oct. 10, 2022, which claims priority to Greek Patent Application 20210100697, filed Oct. 14, 2021, all of which are hereby incorporated by referenced in their entirety and for all purposes.

FIELD

The present application is generally related to audio coding (e.g., audio encoding and/or decoding). For example, systems and techniques are described for performing audio coding at least in part by combining a non-linear source generated by a first machine learning system (e.g., a neural network-based model) with a linear filter with parameters estimated by a second machine learning system (e.g., a neural network-based model).

BACKGROUND

Audio coding (also referred to as voice coding and/or speech coding) is a technique used to represent a digitized audio signal using as few bits as possible (thus compressing the speech data), while attempting to maintain a certain level of audio quality. An audio or voice encoder is used to encode (or compress) the digitized audio (e.g., speech, music, etc.) signal to a lower bit-rate stream of data. The lower bit-rate stream of data can be input to an audio or voice decoder, which decodes the stream of data and constructs an approximation or reconstruction of the original signal. The audio or voice encoder-decoder structure can be referred to as an audio coder (or voice coder or speech coder) or an audio/voice/speech coder-decoder (codec).

Audio coders exploit the fact that speech signals are highly correlated waveforms. Some speech coding techniques are based on a source-filter model of speech production, which assumes that the vocal cords are the source of spectrally flat sound (an excitation signal), and that the vocal tract acts as a filter to spectrally shape the various sounds of speech. The different phonemes (e.g., vowels, fricatives, and voice fricatives) can be distinguished by their excitation (source) and spectral shape (filter).

SUMMARY

Systems and techniques are described herein for performing audio coding at least in part by combining a non-linear source generated by a first machine learning system (e.g., a first neural network-based model) with a linear filter having parameters estimated by a second machine learning system (e.g., a second neural network-based model).

According to at least one example, a method is provided for reconstructing one or more audio signals. The method includes: generating, using a first neural network, an excitation signal for at least one sample of an audio signal at least in part by performing a non-linear operation based on one or more inputs to the first neural network, the excitation signal being configured to excite a learned linear filter; and generating, using the learned linear filter and the excitation signal, at least one sample of a reconstructed audio signal.

In another example, an apparatus for reconstructing one or more audio signals is provided that includes a memory (e.g., configured to store data, such as virtual content data, one or more images, etc.) and one or more processors (e.g., implemented in circuitry) coupled to the memory. The one or more processors are configured to and can: generate, using a first neural network, an excitation signal for at least one sample of an audio signal at least in part by perform a non-linear operation based on one or more inputs to the first neural network, the excitation signal be configured to excite a learned linear filter; and generate, using the learned linear filter and the excitation signal, at least one sample of a reconstructed audio signal.

In another example, anon-transitory computer-readable medium is provided that has stored thereon instructions that, when executed by one or more processors, cause the one or more processors to: generate, using a first neural network, an excitation signal for at least one sample of an audio signal at least in part by perform a non-linear operation based on one or more inputs to the first neural network, the excitation signal be configured to excite a learned linear filter; and generate, using the learned linear filter and the excitation signal, at least one sample of a reconstructed audio signal.

In another example, an apparatus for reconstructing one or more audio signals is provided. The apparatus includes: means for generating, using a first neural network, an excitation signal for at least one sample of an audio signal at least in part by performing a non-linear operation based on one or more inputs to the first neural network, the excitation signal being configured to excite a learned linear filter; and means for generating, using the learned linear filter and the excitation signal, at least one sample of a reconstructed audio signal.

In some aspects, the one or more inputs to the neural network include features associated with the audio signal.

In some aspects, the features include log-mel-frequency spectrum features.

In some aspects, the non-linear operation performed using the first neural network is a non-linear transform.

In some aspects, the first neural network performs the non-linear transform on the one or more inputs to the first neural network and generates the excitation signal, the excitation signal generated in a time domain.

In some aspects, the non-linear operation performed using the first neural network is based on a non-linear likelihood speech model.

In some aspects, to generate the excitation signal using the first neural network, the method, apparatuses, and computer-readable medium described above can include: generating, using the one or more inputs to the first neural network, a probability distribution by providing the one or more inputs to the non-linear likelihood speech model; determining one or more samples from the generated probability distribution; and generating, using the one or more samples from the generated probability distribution, the excitation signal.

In some aspects, the at least one processor is further config the method, apparatuses, and computer-readable medium described above can include modifying the excitation signal by modifying a sampling process used to determine the one or more samples from the generated probability distribution.

In some aspects, to generate the reconstructed audio signal using the learned linear filter, the method, apparatuses, and computer-readable medium described above can include: generating, using a second neural network, one or more parameters for a time-varying linear filter; parameterizing the learned linear filter with the generated one or more parameters; and generating, using the parameterized learned linear filter and the excitation signal, the reconstructed audio signal.

In some aspects, the one or more parameters for the time-varying linear filter include an impulse response, a frequency response, one or more rational transfer function coefficients, or any combination thereof.

The above-described aspects relating to any of the methods, apparatuses, and computer-readable media can be used individually or in any suitable combination.

In some aspects, the apparatuses can be or can be part of a mobile device (e.g., a mobile telephone or so-called "smart phone", a tablet computer, or other type of mobile device), a network-connected wearable device, an extended reality device (e.g., a virtual reality (VR) device, an augmented reality (AR) device, or a mixed reality (MR) device), a personal computer, a laptop computer, a server computer (e.g., a video server or other server device), a television, a vehicle (or a computing device or system of a vehicle), a camera (e.g., a digital camera, an Internet Protocol (IP) camera, etc.), a multi-camera system, a robotics device or system, an aviation device or system, or other device. In some aspects, the apparatuses include at least one camera for capturing one or more images or video frames. For example, the apparatuses can include a camera (e.g., an RGB camera) or multiple cameras for capturing one or more images and/or one or more videos including video frames. In some aspects, the apparatuses includes a display for displaying one or more images, videos, notifications, or other displayable data. In some aspects, the apparatuses includes a transmitter configured to transmit one or more video frame and/or syntax data over a transmission medium to at least one device. In some aspects, the apparatuses described above can include one or more sensors. In some aspects, the at least one processor of the apparatus includes a neural processing unit (NPU), a central processing unit (CPU), a digital signal processor (DSP), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Figure 1:
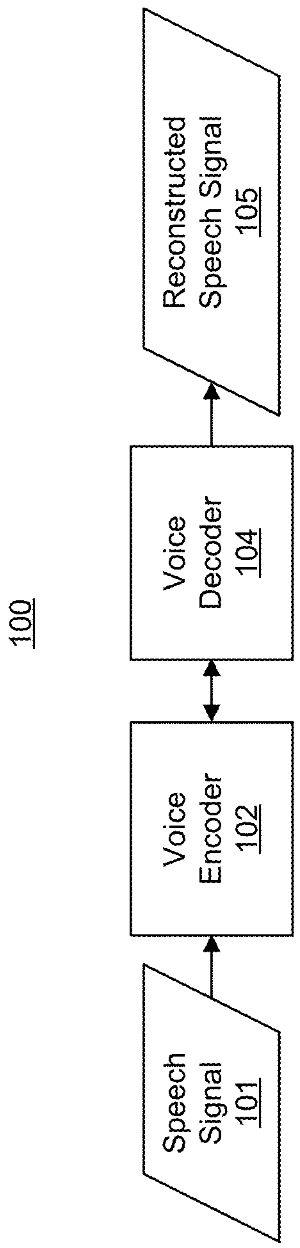
FIG. 1 is a block diagram illustrating an example of a voice coding system, in accordance with some examples.

Audio coding (e.g., speech coding, music signal coding, or other type of audio coding) can be performed on a digitized audio signal (e.g., a speech signal) to compress the amount of data for storage, transmission, and/or other use. FIG. 1 is a block diagram illustrating an example of a voice coding system 100 (which can also be referred to as a voice or speech coder or a voice coder-decoder (codec)). A voice encoder 102 of the voice coding system 100 can use a voice coding algorithm to process a speech signal 101. The speech signal 101 can include a digitized speech signal generated from an analog speech signal from a given source. For instance, the digitized speech signal can be generated using a filter to eliminate aliasing, a sampler to convert to discrete-time, and an analog-to-digital converter for converting the analog signal to the digital domain. The resulting digitized speech signal (e.g., speech signal 101) is a discrete-time speech signal with sample values (referred to herein as samples) that are also discretized.

Using the voice coding algorithm, the voice encoder 102 can generate a compressed signal (including a lower bit-rate stream of data) that represents the speech signal 101 using as few bits as possible, while attempting to maintain a certain quality level for the speech. The voice encoder 102 can use any suitable voice coding algorithm, such as a linear prediction coding algorithm (e.g., Code-excited linear prediction (CELP), algebraic-CELP (ACELP), or other linear prediction technique) or other voice coding algorithm.

The voice encoder 102 can compress the speech signal 101 in an attempt to reduce the bit-rate of the speech signal 101. The bit-rate of a signal is based on the sampling frequency and the number of bits per sample. For instance, the bit-rate of a speech signal can be determined as follows:

$$BR = S * b,$$

Where BR is the bit-rate, S is the sampling frequency, and b is the number of bits per sample. In one illustrative example, at a sampling frequency (S) of 8 kilohertz (kHz) and at 16 bits per sample (b), the bit-rate of a signal would be a bit-rate of 128 kilobits per second (kbps).

The compressed speech signal can then be stored and/or sent to and processed by a voice decoder 104. In some examples, the voice decoder 104 can communicate with the voice encoder 102, such as to request speech data, send feedback information, and/or provide other communications to the voice encoder 102. In some examples, the voice encoder 102 or a channel encoder can perform channel coding on the compressed speech signal before the compressed speech signal is sent to the voice decoder 104. For instance, channel coding can provide error protection to the bitstream of the compressed speech signal to protect the bitstream from noise and/or interference that can occur during transmission on a communication channel.

The voice decoder 104 can decode the data of the compressed speech signal and construct a reconstructed speech signal 105 that approximates the original speech signal 101. The reconstructed speech signal 105 includes a digitized, discrete-time signal that can have the same or similar bit-rate as that of the original speech signal 101. The voice decoder 104 can use an inverse of the voice coding algorithm used by the voice encoder 102, which as noted above can include any suitable voice coding algorithm, such as a linear prediction coding algorithm (e.g., CELP, ACELP, or other suitable linear prediction technique) or other voice coding algorithm. In some cases, the reconstructed speech signal 105 can be converted to continuous-time analog signal, such as by performing digital-to-analog conversion and anti-aliasing filtering.

Voice coders can exploit the fact that speech signals are highly correlated waveforms. The samples of an input speech signal can be divided into blocks of N samples each, where a block of N samples is referred to as a frame. In one illustrative example, each frame can be 10-20 milliseconds (ms) in length.

Various voice coding algorithms can be used to encode a speech signal. For instance, code-excited linear prediction (CELP) is one example of a voice coding algorithm. The CELP model is based on a source-filter model of speech production, which assumes that the vocal cords are the source of spectrally flat sound (an excitation signal), and that the vocal tract acts as a filter to spectrally shape the various sounds of speech. The different phonemes (e.g., vowels, fricatives, and voice fricatives) can be distinguished by their excitation (source) and spectral shape (filter).

In general, CELP uses a linear prediction (LP) model to model the vocal tract, and uses entries of a fixed codebook (FCB) as input to the LP model. For instance, long-term linear prediction can be used to model pitch of a speech signal, and short-term linear prediction can be used to model the spectral shape (phoneme) of the speech signal. Entries in the FCB are based on coding of a residual signal that remains after the long-term and short-term linear prediction modeling is performed. For example, long-term linear prediction and short-term linear prediction models can be used for speech synthesis, and a fixed codebook (FCB) can be searched during encoding to locate the best residual for input to the long-term and short-term linear prediction models. The FCB provides the residual speech components not captured by the short-term and long-term linear prediction models. A residual, and a corresponding index, can be selected at the encoder based on an analysis-by-synthesis process that is performed to choose the best parameters so as to match the original speech signal as closely as possible. The index can be sent to the decoder, which can extract the corresponding LTP residual from the FCB based on the index.

Figure 2:
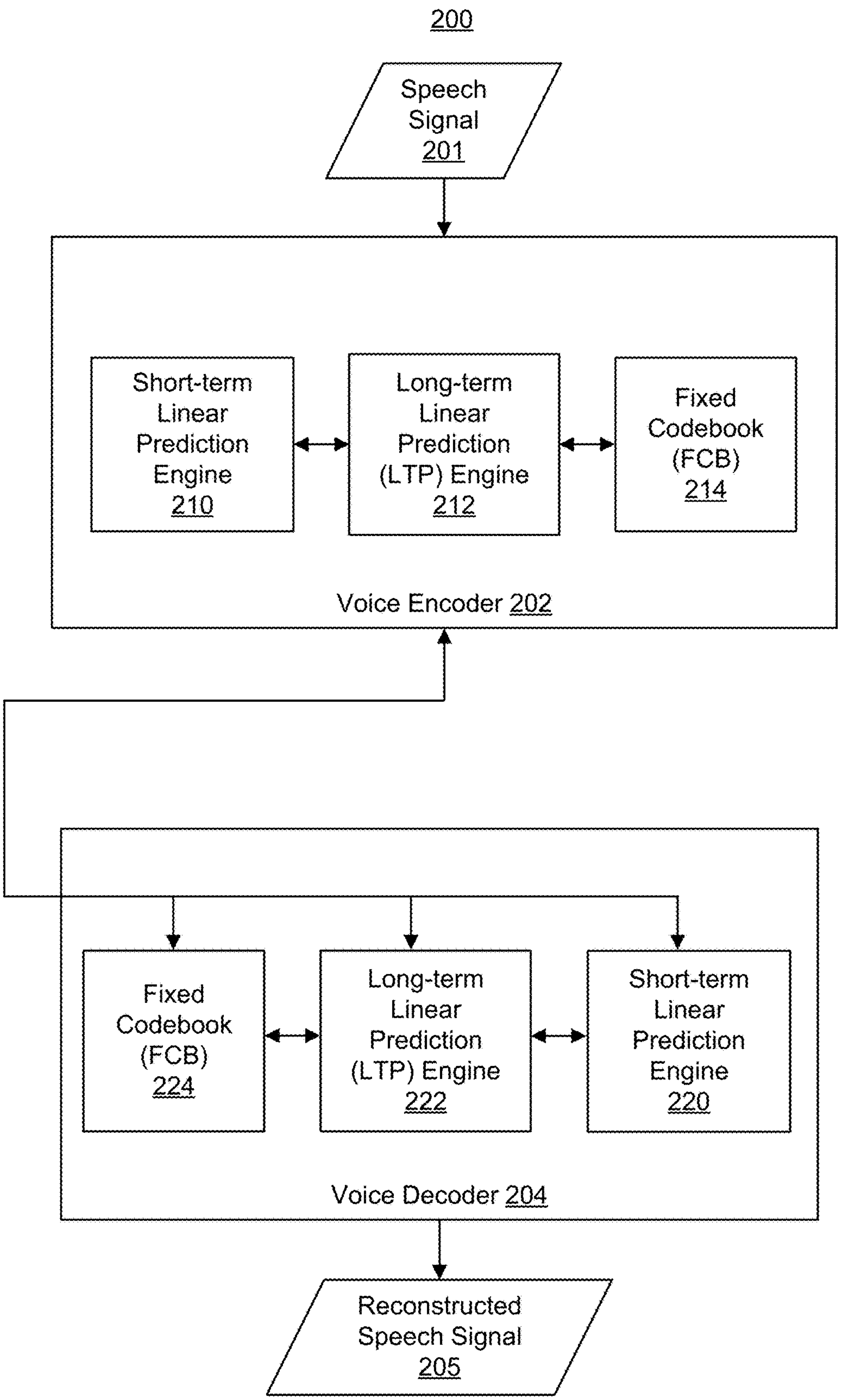
FIG. 2 is a block diagram illustrating an example of a CELP-based voice coding system utilizing a fixed codebook (FCB), in accordance with some examples.

FIG. 2 is a block diagram illustrating an example of a CELP-based voice coding system 200, including a voice encoder 202 and a voice decoder 204. The voice encoder 202 can obtain a speech signal 201 and can segment the samples of the speech signal into frames and sub-frames. For instance, a frame of N samples can be divided into sub-frames. In one illustrative example, a frame of 240 samples can be divided into four sub-frames each having 60 samples. For each frame, sub-frame, or sample, the voice encoder 202 chooses the parameters (e.g., gain, filter coefficients or linear prediction (LP) coefficients, etc.) for a synthetic speech signal so as to match as much as possible the synthetic speech signal with the original speech signal.

The voice encoder 202 can include a short-term linear prediction (LP) engine 210, a long-term linear prediction (LTP) engine 212, and a fixed codebook (FCB) 214. The short-term LP engine 210 models the spectral shape (phoneme) of the speech signal. For example, the short-term LP engine 210 can perform a short-term LP analysis on each frame to yield linear prediction (LP) coefficients. In some examples, the input to the short-term LP engine 210 can be the original speech signal or a pre-processed version of the original speech signal. In some implementations, the short-term LP engine 210 can perform linear prediction for each frame by estimating the value of a current speech sample based on a linear combination of past speech samples. For example, a speech signal s(n) can be represented using an autoregressive (AR) model, such as $$s(n) = \sum\nolimits_{k=1}^{m} a_k s(n-k) + e(n),$$

where each sample is represented as a linear combination of the previous m samples plus a prediction error term e(n). The weighting coefficients $a_1$, $a_2$, through am are referred to as the LP coefficients. The prediction error term e(n) can be found as follows:

$$e(n) = s(n) - \sum\nolimits_{k=1}^{m} a_k s(n-k).$$

By minimizing the mean square prediction error with respect to the filter coefficients, the short-term LP engine 210 can obtain the LP coefficients. The LP coefficients can be used to form an analysis filter:

$$\begin{aligned} A(z) &= 1 - \sum_{k=1}^{m} a_k z^{-k} \\ &= 1 - P(z). \end{aligned}$$

The short-term LP engine 210 can solve for P(z) (which can be referred to as a transfer function) by computing the LP coefficients ($a_k$) that minimize the error in the above AR model equation (s(n)) or other error metric. In some implementations, the LP coefficients can be determined using a Levinson-Durbin method, a Leroux-Gueguen algorithm, or other suitable technique. In some examples, the voice encoder 202 can send the LP coefficients to the voice decoder 204. In some examples, the voice decoder 204 can determine the LP coefficients, in which case the voice encoder 202 may not send the LP coefficients to the voice decoder 204. In some examples, Line Spectral Frequencies (LSFs) can be computed instead of or in addition to LP coefficients.

The LTP engine 212 models the pitch of the speech signal. Pitch is a feature that determines the spacing or periodicity of the impulses in a speech signal. For example, speech signals are generated when the airflow from the lungs is periodically interrupted by movements of the vocal cords. The time between successive vocal cord openings corresponds to the pitch period. The LTP engine 212 can be applied to each frame or each sub-frame of a frame after the short-term LP engine 210 is applied to the frame. The LTP engine 212 can predict a current signal sample from a past sample that is one or more pitch periods apart from a current sample (hence the term "long-term"). For instance, the current signal sample can be predicted as $p_r(n)=g_p r(n-T)$, where T denotes the pitch period, $g_p$ denotes the pitch gain, and $r(n-T)$ denotes an LP residual for a previous sample one or more pitch periods apart from a current sample. Pitch period can be estimated at every frame. By comparing a frame with past samples, it is possible to identify the period in which the signal repeats itself, resulting in an estimate of the actual pitch period. The LTP engine 212 can be applied separately to each sub-frame.

The FCB 214 can include a number (denoted as L) of long-term linear prediction (LTP) residuals. An LTP residual includes the speech signal components that remain after the long-term and short-term linear prediction modeling is performed. The LTP residuals can be, for example, fixed or adaptive and can contain deterministic pulses or random noise (e.g., white noise samples). The voice encoder 202 can pass through the number L of LTP residuals in the FCB 214 a number of times for each segment (e.g., each frame or other group of samples) of the input speech signal, and can calculate an error value (e.g., a mean-squared error value) after each pass. The LTP residuals can be represented using codevectors. The length of each codevector can be equal to the length of each sub-frame, in which case a search of the FCB 214 is performed once every sub-frame. The LTP residual providing the lowest error can be selected by the voice encoder 202. The voice encoder 202 can select an index corresponding to the LTP residual selected from the FCB 214 for a given sub-frame or frame. The voice encoder 202 can send the index to the voice decoder 204 indicating which LTP residual is selected from the FCB 214 for the given sub-frame or frame. A gain associated with the lowest error can also be selected and send to the voice decoder 204.

The voice decoder 204 includes an FCB 224, an LTP engine 222, and a short-term LP engine 220. The FCB 224 has the same LTP residuals (e.g., codevectors) as the FCB 214. The voice decoder 204 can extract an LTP residual from the FCB 224 using the index transmitted to the voice decoder 204 from the voice encoder 202. The extracted LTP residual can be scaled to the appropriate level and filtered by the LTP engine 222 and the short-term LP engine 220 to generate a reconstructed speech signal 205. The LTP engine 222 creates periodicity in the signal associated with the fundamental pitch frequency, and the short-term LP engine 220 generates the spectral envelope of the signal.

Other linear predictive-based coding systems can also be used to code voice signals, including enhanced voice services (EVS), adaptive multi-rate (AMR) voice coding systems, mixed excitation linear prediction (MELP) voice coding systems, linear predictive coding-10 (LPC-10), among others.

A voice codec for some applications and/or devices (e.g., Internet-of-Things (IoT) applications and devices) is required to deliver higher quality coding of speech signals at low bit-rates, with low complexity, and with low memory requirements. Existing linear predictive-based codecs cannot meet such requirements. For example, ACELP-based coding systems provide high quality, but do not provide low bit-rate or low complexity/low memory. Other linear-predictive coding systems provide low bit-rate and low complexity/low memory, but do not provide high quality.

In some cases, machine learning systems (e.g., using one or more neural network models) can be used to generate reconstructed voice or audio signals. For example, using features extracted from a frame of audio data, a neural network-based voice decoder can generate coefficients for at least one linear filter. In some examples, a neural network-based voice decoder can be trained to estimate the parameters (e.g., linear filter coefficients) of a speech synthesis pipeline. The linear filter(s) that are generated or tuned using a neural network-based voice decoder can then be used to generate a reconstructed signal.

However, such a neural network-based voice decoder can be highly complex and resource intensive. In some examples, a neural network-based voice decoder can be trained to directly predict speech samples. For instance, the neural network-based voice decoder can be trained to perform the operations of a linear predictive filter (LPC), such as the short-term LP engine 210 of FIG. 2. Such LPC operations can include complex operations that require the use of a large amount of computing resources by the neural network-based voice decoder.

In some examples, a neural network-based voice decoder can be trained to perform one or more non-linear operations (e.g., a non-linear transform, a non-linear likelihood model, etc.). The non-linear operations can be performed directly on input features obtained for a voice or audio signal and/or can be performed on a signal that was itself generated directly from the input features. Non-linear transforms and other non-linear operations can provide greater flexibility, accuracy, and output quality when used in a neural network-based voice decoder. However, non-linear transforms and non-linear operations can also be associated with a high degree of complexity and computational expense, that in some cases can be a full order of magnitude greater than that of the previously mentioned linear operations.

Systems, apparatuses, methods (also referred to as processes), and computer-readable media (collectively referred to as "systems and techniques") are described herein that perform audio coding (e.g., voice decoding) at least in part by combining a learned, non-linear source (or non-linear engine) with a learned, linear filter. In an illustrative example, the linear filter is outside of or separate from the non-linear source. In some cases, the non-linear source can be generated by a first machine learning system and the linear filter can be generated by a second machine learning system. In some cases, the non-linear source can be generated by a first portion of a machine learning system) and the linear filter can be generated by a second portion of a machine learning system. In some examples, one or more (or both) of the first and second machine learning systems (or first and second portions of a machine learning system) can be neural network-based models. While examples are described herein with respect to first and second machine learning systems, the techniques can be applied using a first portion of a machine learning system (for the non-linear source) and a second portion of the machine learning system (for the linear filter).

The learned, non-linear source can perform anon-linear transform or other non-linear operation (e.g., applying a non-linear likelihood model) over a set of input features obtained for a voice or audio signal, and generate an excitation signal as output. The excitation signal from the learned, non-linear source can subsequently be provided as input to the learned, linear filter to generate a reconstructed voice or audio signal. In some cases, the second machine learning system can be trained to generate or estimate parameters (e.g., linear filter coefficients) that characterize the linear filter. The learned, linear filter can be a linear predictive coding (LPC) filter and/or a time-varying linear filter. By combining a neural network-based non-linear operation with a separate, neural network-based linear filtering operation, advantages provided by the audio or voice coding systems described herein as compared to existing neural network-based audio or voice codecs include reducing the complexity of the machine learning system (e.g., of the neural networks), enhancing the quality of reconstructed speech signals, among others. For example, the systems and techniques described herein can provide an improved tradeoff between computational complexity and performance as compared to either a purely linear approach or a purely non-linear approach. Such advantages allow such an audio or voice coding system to be well-suited for various types of applications, for example including mobile (smartphone, etc.), retail (point-of-service (POS), etc.), security, smart cities/buildings, wearables, industrial IoT, IoT space applications in general, among others.

Figure 3:
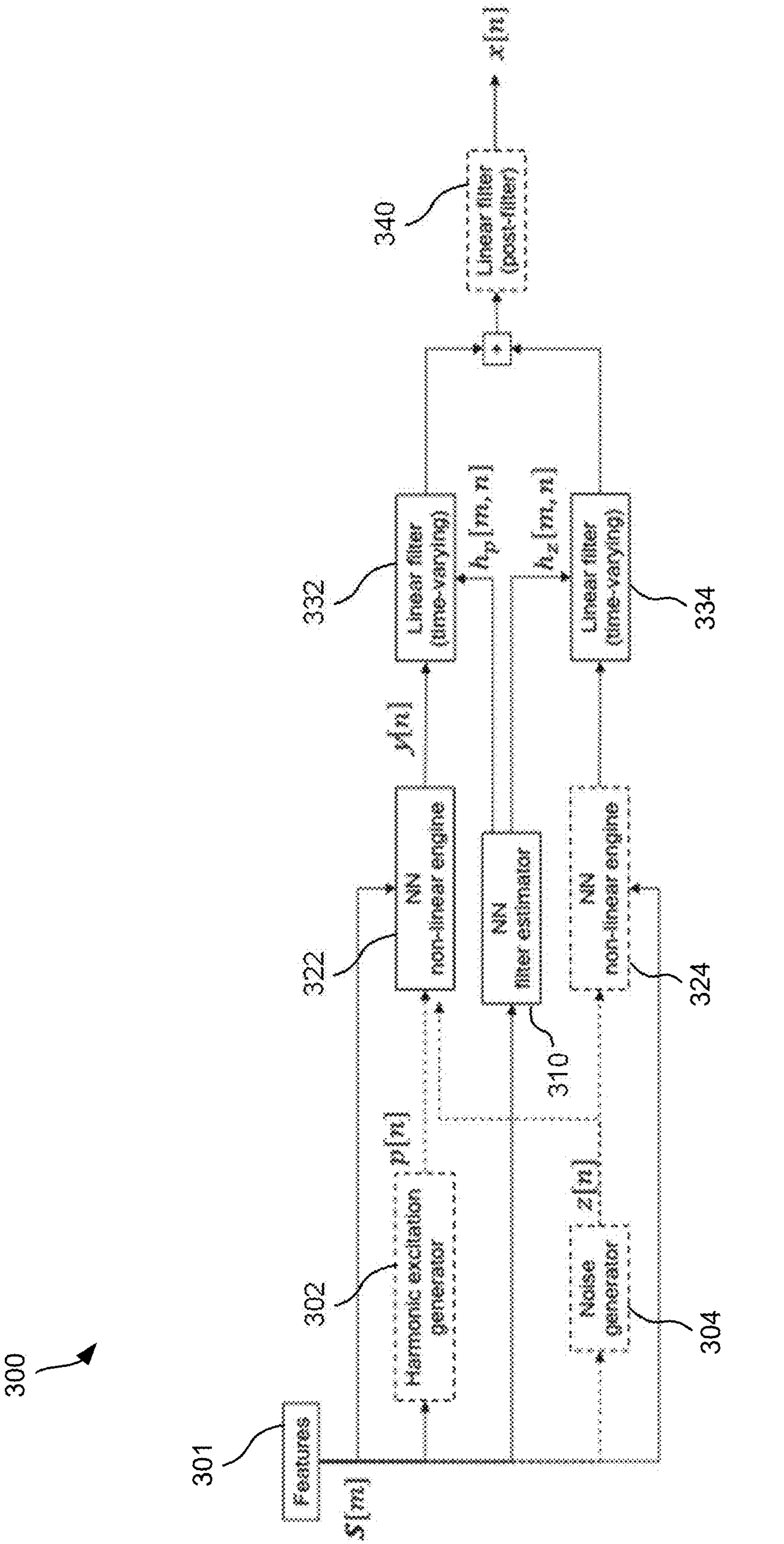
FIG. 3 is a block diagram illustrating an example of a voice coding system utilizing a linear time-varying filter generated using a neural network model and a separate neural network-based non-linear engine, in accordance with some examples.

FIG. 3 is a diagram illustrating an example of a voice decoding system 300 that utilizes a neural network-based approach to train one or more non-linear engines 322,324 and utilizes a separate neural network-based filter estimator 310 to provide one or more linear filters 332,334. As illustrated in FIG. 3, an output of neural network-based non-linear engine 322 is provided to time-varying linear filter 332 as an input. In some examples, the order can be reversed, such that the output of linear filter 332 is provided to the neural network-based non-linear engine 322 as an input. In some cases, one or more training processes for training the neural networks can be based on the relative ordering of the linear and non-linear components within voice decoding system 300. The voice decoding system 300 can be configured to decode data of a compressed speech signal, shown in FIG. 3 as features 301 including a speech feature vector S[m] for a frame m, to generate a reconstructed speech signal x[n] (also referred to as a synthesized speech sample) for a current time instant n that approximates an original speech signal that was previously compressed by a voice encoder (not shown) and where m indicates a frame index. In some cases, speech features may be analyzed on a per frame basis for frames of reconstructed speech signal x[n]. In some examples, the speech feature vector S[m] can be a log-Mel spectrogram generated by a feature extraction engine (not shown).

The voice encoder can be similar to and can perform some or all of the functions of the voice encoder 102 described above with respect to FIG. 1, the voice encoder 202 described above described above with respect to FIG. 2, or other type of voice encoder. For example, the voice encoder can include a short-term LP engine, an LTP engine, and an FCB. The voice encoder can extract (and in some cases quantize) a set of features (referred to as a feature set) from the speech signal and can send the extracted (and in some cases quantized) feature set to the voice decoding system 300. The features that are computed by the voice encoder can depend on a particular encoder implementation used. Various illustrative examples of feature sets are provided below according to different encoder implementations, which can be extracted by the voice encoder (and in some cases quantized) and sent to the voice decoding system 300. However, one of ordinary skill will appreciate that other feature sets can be extracted by the voice encoder. For example, the voice encoder can extract any set of features, can quantize that feature set, and can send the feature set to the voice decoding system 300.

As noted above, various combinations of features can be extracted as a feature set by the voice encoder. For example, a feature set can include one or any combination of the following features: Linear Prediction (LP) coefficients; Line Spectral Pairs (LSPs); Line Spectral Frequencies (LSFs); pitch lag with integer or fractional accuracy; pitch gain; pitch correlation; Mel-scale frequency cepstral coefficients (also referred to as mel cepstrum) of the speech signal; Bark-scale frequency cepstral coefficients (also referred to as bark cepstrum) of the speech signal; Mel-scale frequency cepstral coefficients of the LTP residual; Bark-scale frequency cepstral coefficients of the LTP residual; a spectrum (e.g., Discrete Fourier Transform (DFT) or other spectrum) of the speech signal; and/or a spectrum (e.g., DFT or other spectrum) of the LTP residual.

For any one or more of the other features listed above, the voice encoder can use any estimation and/or quantization method, such as an engine or algorithm from any suitable voice codec (e.g., EVS, AMR, or other voice codec) or a neural network-based estimation and/or quantization scheme (e.g., convolutional or fully-connected (dense) or recurrent Autoencoder, or other neural network-based estimation and/or quantization scheme). The voice encoder can also use any frame size, frame overlap, and/or update rate for each feature. Examples of estimation and quantization methods for each example feature are provided below for illustrative purposes, where other examples of estimation and quantization methods can be used by the voice encoder.

As noted above, one example of features that can be extracted from a voice signal by the voice encoder includes LP coefficients and/or LSFs. Various estimation techniques can be used to compute the LP coefficients and/or LSFs. For example, as described above with respect to FIG. 2, the voice encoder can estimate LP coefficients (and/or LSFs) from a speech signal using the Levinson-Durbin algorithm. In some examples, the LP coefficients and/or LSFs can be estimated using an autocovariance method for LP estimation. In some cases, the LP coefficients can be determined, and an LP to LSF conversion algorithm can be performed to obtain the LSFs. Any other LP and/or LSF estimation engine or algorithm can be used, such as an LP and/or LSF estimation engine or algorithm from an existing codec (e.g., EVS, AMR, or other voice codec).

Various quantization techniques can be used to quantize the LP coefficients and/or LSFs. For example, the voice encoder can use a single stage vector quantization (SSVQ) technique, a multi-stage vector quantization (MSVQ), or other vector quantization technique to quantize the LP coefficients and/or LSFs. In some cases, a predictive or adaptive SSVQ or MSVQ (or other vector quantization technique) can be used to quantize the LP coefficients and/or LSFs. In another example, an autoencoder or other neural network-based technique can be used by the voice encoder to quantize the LP coefficients and/or LSFs. Any other LP and/or LSF quantization engine or algorithm can be used, such as an LP and/or LSF quantization engine or algorithm from an existing codec (e.g., EVS, AMR, or other voice codec).

Another example of features that can be extracted from a voice signal by the voice encoder includes pitch lag (integer and/or fractional), pitch gain, and/or pitch correlation. Various estimation techniques can be used to compute the pitch lag, pitch gain, and/or pitch correlation. For example, the voice encoder can estimate the pitch lag, pitch gain, and/or pitch correlation (or any combination thereof) from a speech signal using any pitch lag, gain, correlation estimation engine or algorithm (e.g., autocorrelation-based pitch lag estimation). For example, the voice encoder can use a pitch lag, gain, and/or correlation estimation engine (or algorithm) from any suitable voice codec (e.g., EVS, AMR, or other voice codec). Various quantization techniques can be used to quantize the pitch lag, pitch gain, and/or pitch correlation. For example, the voice encoder can quantize the pitch lag, pitch gain, and/or pitch correlation (or any combination thereof) from a speech signal using any pitch lag, gain, correlation quantization engine or algorithm from any suitable voice codec (e.g., EVS, AMR, or other voice codec). In some cases, an autoencoder or other neural network-based technique can be used by the voice encoder to quantize the pitch lag, pitch gain, and/or pitch correlation features.

Another example of features that can be extracted from a voice signal by the voice encoder includes the Mel cepstrum coefficients and/or Bark cepstrum coefficients of the speech signal, and/or the Mel cepstrum coefficients and/or Bark cepstrum coefficients of the LTP residual. Various estimation techniques can be used to compute the Mel cepstrum coefficients and/or Bark cepstrum coefficients. For example, the voice encoder can use a Mel or Bark frequency cepstrum technique that includes Mel or Bark frequency filterbanks computation, filterbank energy computation, logarithm application, and discrete cosine transform (DCT) or truncation of the DCT. Various quantization techniques can be used to quantize the Mel cepstrum coefficients and/or Bark cepstrum coefficients. For example, vector quantization (single stage or multistage) or predictive/adaptive vector quantization can be used. In some cases, an autoencoder or other neural network-based technique can be used by the voice encoder to quantize the Mel cepstrum coefficients and/or Bark cepstrum coefficients. Any other suitable cepstrum quantization methods can be used.

Another example of features that can be extracted from a voice signal by the voice encoder includes the spectrum of the speech signal and/or the spectrum of the LTP residual. Various estimation techniques can be used to compute the spectrum of the speech signal and/or the LTP residual. For example, a Discrete Fourier transform (DFT), a Fast Fourier Transform (FFT), or other transform of the speech signal can be determined. Quantization techniques that can be used to quantize the spectrum of the voice signal can include vector quantization (single stage or multistage) or predictive/adaptive vector quantization. In some cases, an autoencoder or other neural network-based technique can be used by the voice encoder to quantize the spectrum. Any other suitable spectrum quantization methods can be used.

As noted above, any one of the above-described features or any combination of the above-described features can be estimated, quantized, and sent by the voice encoder to the voice decoding system 300 depending on the particular encoder implementation that is used. In one illustrative example, the voice encoder can estimate, quantize, and send LP coefficients, pitch lag with fractional accuracy, pitch gain, and pitch correlation. In another illustrative example, the voice encoder can estimate, quantize, and send LP coefficients, pitch lag with fractional accuracy, pitch gain, pitch correlation, and the Bark cepstrum of the speech signal. In another illustrative example, the voice encoder can estimate, quantize, and send LP coefficients, pitch lag with fractional accuracy, pitch gain, pitch correlation, and the spectrum (e.g., DFT, FFT, or other spectrum) of the speech signal. In another illustrative example, the voice encoder can estimate, quantize, and send pitch lag with fractional accuracy, pitch gain, pitch correlation, and the Bark cepstrum of the speech signal. In another illustrative example, the voice encoder can estimate, quantize, and send pitch lag with fractional accuracy, pitch gain, pitch correlation, and the spectrum (e.g., DFT, FFT, or other spectrum) of the speech signal. In another illustrative example, the voice encoder can estimate, quantize, and send LP coefficients, pitch lag with fractional accuracy, pitch gain, pitch correlation, and the Bark cepstrum of the LTP residual. In another illustrative example, the voice encoder can estimate, quantize, and send LP coefficients, pitch lag with fractional accuracy, pitch gain, pitch correlation, and the spectrum (e.g., DFT, FFT, or other spectrum) of the LTP residual.

As discussed previously, the voice decoding system 300 includes one or more neural network-based non-linear engines (or modules) and one or more learned, linear filters. For example, the voice decoding system 300 includes at least a first neural network-based non-linear engine 322 and at least a first learned, linear filter 332, which is shown here as a time-varying linear filter. In some examples, one or more additional or optional neural network-based non-linear engines 324 can also be utilized, which can be the same as or similar to the first non-linear engine 322. Similarly, one or more optional linear filters 334 can be utilized, which can be the same as or similar to the first learned, linear filter 334. In some cases, there can be a 1:1 ratio between the number of neural network-based non-linear engines and the number of learned, linear filters.

The neural network-based non-linear engine 322, 324 can receive as input one or more of the features 301 (e.g., from speech feature vector S[m]). In some examples, an optional harmonic excitation generator 302 can be used on the input path of non-linear engine 322, wherein the harmonic excitation generator 302 receives the speech feature vector S[m] of features 301 and outputs a time-dependent harmonic excitation signal p[n] to the non-linear engine 322. In some examples, harmonic excitation generator 302 can use pitch as the input over which it operates to generate the harmonic excitation signal p[n]. Pitch can be explicitly present in the features 301 or estimated from one or more other features if not explicitly present in the features 301.

In some examples, the optional neural network-based non-linear engine 324 can be used in combination with an optional noise generator 304. Noise generator 304 can operate on the speech feature vector S[m] of the features 301 and use one or more energy features and/or energy estimates to tune the noise energy. Noise generator 304 outputs a time-dependent noise excitation signal z[n] to the non-linear engine 324. In some cases, where noise generator 304 is not used, the neural network-based non-linear engine 324 can itself operate on the features 301 directly, as described above with respect to non-linear engine 322.

The neural network-based non-linear engines 322,324 described herein can operate on a feature input directly and/or can also operate on a signal (e.g., a time-domain signal) that is derived from the feature input 301. The outputs of neural network-based non-linear engines 322,324 can be coupled to the inputs of the linear filters 332,334, respectively. As illustrated, non-linear engine 322 provides as output a time-domain signal y[n]. In some examples, y[n] is a linear filter excitation signal, e.g., an excitation signal to learned, linear filter 332. Although not shown, the optional non-linear engine 324 can output a similar time-domain signal as an excitation signal to the learned, linear filter 334.

One or more of the neural network-based non-linear engines 322,324 are trained to perform a non-linear operation over a received input and provide an output such as the time-domain excitation signal y[n]. In an illustrative example, one or more of the neural network-based non-linear engines 322,324 can apply a non-linear transform or a non-linear likelihood model. As mentioned previously, the non-linear engines 322,324 can operate on a feature input 301 directly and/or can operate on a time-domain signal that was generated based on the features 301. For both input types, the non-linear engines 322,324 can output a time-domain signal because, as illustrated, the linear filters 332, 334 are provided downstream from the non-linear engines 322,324—in some cases, the linear filters cannot operate on features directly and instead are configured to operate on time-domain signals. In some examples, one or more of the learned, linear filters 332,334 can instead be provided as a learned, linear transform. In some examples, one or more of the learned, linear filters 332,334 can be a closed transformation, e.g., in which the input and output are in the same domain, which in the context of FIG. 3 is shown as the time domain n.

In addition to receiving an excitation signal, such as the time-domain excitation signal y[n], from the non-linear engine 322, the learned, linear filter 332 is illustrated as receiving an additional input $h_p$[m,n] from neural network filter estimator 310. The input $h_p$[m,n] can include one or more parameters that characterize and/or specify characteristics that are to be applied at learned linear filter 332. For example, the linear filter characterization input $h_p$[m,n]can include, but is not limited to, an impulse response of the learned filter, a frequency response of the learned filter, one or more rational transfer function coefficients of the learned filter, a magnitude and phase response of the learned filter, etc. The neural network filter estimator 310 can be trained to receive the features 301 as input and generate the linear filter characterization parameters $h_p$[m,n] as output. As illustrated, the neural network filter estimator 310 can be used in a one-to-many fashion, wherein the same feature input 301 is used to generate multiple sets of linear filter characterization parameters $h_p$[m,n] and $h_z$[m,n], which are provided to the learned linear filters 332 and 334, respectively. In some examples, multiple neural network filter estimators can be trained and utilized to generate the corresponding sets of linear filter characterization parameters h[m,n] for the multiple linear filters that can be utilized in the presently disclosed voice decoding system 300. In some examples, the neural network filter estimator 310 can be a neural homomorphic vocoder, convolutional architecture NHVNet (Neural Homomorphic Vocoder Network), a stack of convolutional layers and nonlinear activations, a recurrent neural network, or other similar system.

The outputs of learned linear filter 332 (and optional learned linear filter 334, when present) can in some examples be provided to an optional post-filter 340, which is illustrated as a linear filter. When present, the optional post-filter 340 can be a time-invariant filter or a time-varying filter. In some examples, the optional post-filter 340 can be estimated by conventional LPC methods, e.g., the optional post-filter 340 can be an LPC filter. In some cases, optional post-filter 340 can be estimated by a dedicated training process, e.g., in which the optional post-filter 340 is also a learned filter that is neural network-based, similar to the manner in which the learned, linear filters 332,334 are neural network-based. Optional post-filter 340 receives the output(s) from the learned linear filters 332,334 and generates a reconstructed audio signal x[n]. In some examples, the linear filters 332,334 and optional post-filter 340 can be trained in the same process or can be trained using the same process. In some examples, the optional post-filter 340 can also be estimated by the neural network filter estimator 310, in instances where optional post-filter is a learned, neural network-based filter.

In some examples, the optional post-filter 340 can be a learned filter that is time invariant. When optional post-filter 340 is time invariant, its parameters do not change per frame and as such, may not depend on the input features 301 associated with the frame. In this example, because optional post-filter 340 is time invariant, it can be learned in a manner that is not neural network based. For instance, one or more parameters of optional post-filter 340 can be trained by a training process that adjusts and determines final parameters for the optional post-filter 340 prior to use of the optional post-filter 340 in the voice decoding system 300. In an illustrative example, the optional post-filter 340 can be trained in advance to determine its parameters, which are then fixed and then used during inference and/or operation of the voice decoding system 300 to perform a time-invariant filtering of an input signal to optional post-filter 340 (e.g., an input signal determined as a combination of the output signals from the learned linear filters 332,334).

The neural network model of the neural network filter estimator 302 can include any neural network architecture that can be trained to model the filter coefficients for the linear time-varying filter 304. Examples of neural network architectures that can be included in the neural network filter estimator 302 include Fully-Connected Networks, Convolutional Networks, Recurrent Networks, Transformer Networks, Autoencoder Networks, or any their combinations.

The voice decoding system 300 (e.g., the neural network model of the neural network filter estimator 310 and/or the neural network model(s) of the neural network-based non-linear engines 322,324) can be trained using any suitable neural network training technique. Examples of neural network training techniques include a distortion loss on fixed or learned features, with an adversarial (Generative Adversarial Networks) loss, a likelihood-based loss, a diffusion-based loss, or any of their combinations. In some examples, the neural network model of the neural network filter estimator 310 and/or the non-linear engines 322,324 can be trained using supervised learning techniques based on backpropagation. For instance, corresponding input-output pairs can be provided to the neural network filter estimator 310 and/or the non-linear engines 322,324 for training. The input-output pairs or training data provided to the neural network filter estimator 310 can be the same as or different from the training data provided to the non-linear engines 322,324. In some cases, the neural network-based non-linear engines 322,324 can use the same training data. In other cases, the neural network-based non-linear engines 322,324 can use different sets of training data.

In some examples, the neural network model of the neural network filter estimator 310 and/or the non-linear engines 322,324 can be trained using self-supervised learning techniques. For instance, in an illustrative self-supervised learning technique, the input-output training data pairs can be known, but training can be performed without labeling of the training data. For example, in the context of the systems and techniques described herein, the target output is a known reference speech waveform. Using a self-supervised learning technique, such a target output can be used for training without any labeling—the training process can proceed with a goal of matching the (unlabeled) target output that is a known reference speech waveform.

In one example, for each time instant n, the training data input to the neural network filter estimator 310 (and/or the non-linear engines 322,324) can be of a same or similar form or structure as the features 301 that are received as input during operation of the trained voice decoding system 300. For example, if the features 301 are log-mel-frequency spectrum features or coefficients then the training data inputs for training the neural network filter estimator 310 and/or the neural network-based non-linear engines 322,324 can also be log-mel-frequency spectrum features or coefficients. In some examples, the target output (or label or ground truth) for training the neural network filter estimator 310 and/or the non-linear engines 322,324 can include a target audio sample for the current time instant n. In such examples, a loss function (e.g., used for training) can be computed based on the target audio sample at time n and the reconstructed audio sample x[n] at the same time instant n. In some examples, the target output for training the neural network filter estimator 310 can include a linear time varying filter output for the time instant n, in which case a loss function can be computed based on or including a measured residual output of the linear filters 332,334 and the corresponding linear time varying filter output included in the target output for the same time instant n. Similarly, in some examples, the target output for training the neural network-based non-linear engines 322,324 can include a target filter excitation signal, in which case a loss function can be computed based on or including a measured residual output of the non-linear engines 322,324 (e.g., y[n]) and the corresponding target filter excitation signal(s) included in the target output for the same time instant n.

Backpropagation can be performed to train the neural network filter estimator 310 and/or the non-linear engines 322,324 using the training data inputs and the target output. Backpropagation can include a forward pass, a loss function, a backward pass, and a parameter update to update one or more other parameters (e.g., weight, bias, or another parameter). The forward pass, loss function, backward pass, and parameter update are performed for one training iteration. The process can be repeated for a certain number of iterations for each set of inputs until the neural network filter estimator 310 and/or the non-linear engines 322,324 are trained well enough so that the weights (and/or other parameters) of the various layers are accurately tuned.

The forward pass can include passing the input training data (e.g., log-mel-frequency spectrum features or coefficients, such as features 301 from a speech feature vector S[m] shown in FIG. 3) through the neural network filter estimator 310 and/or the non-linear engines 322,324. The weights of the neural network model are initially randomized before the neural network filter estimator 310 and/or the non-linear engines 322,324 are trained. For a first training iteration for the neural network filter estimator 310 and/or the non-linear engines 322,324, the output will likely include values that do not give preference to any particular output due to the weights being randomly selected at initialization. With the initial weights, the neural network filter estimator is unable to determine low level features and thus cannot make an accurate estimation of the filter coefficients for the linear time-varying filter 304. Similarly, with the initial weights the non-linear engines 322,324 are unable to determine low level features and thus cannot accurately perform a desired non-linear transform or other non-linear operation for which the non-linear engine is being trained. A loss function can be used to analyze the loss (or error) in the reconstructed or synthesized sample output. Any suitable loss function definition can be used. One example of a loss function includes a mean squared error (MSE). The MSE is defined as $$E_{total} = \sum \frac{1}{2} (\text{target} - \text{output})^2,$$

which calculates the sum of one-half times the actual answer minus the predicted (output) answer squared. The loss can be set to be equal to the value of $E_{total}$.

The loss (or error) will be high for the first training examples (e.g., waveforms, audio samples, etc.) since the actual values will be much different than the predicted output. The goal of training is to minimize the amount of loss so that the predicted output is the same as the training label. The neural network filter estimator 310 and/or the non-linear engine 322,324 can perform a backward pass by determining which inputs (weights) most contributed to the loss of the network and can adjust the weights so that the loss decreases and is eventually minimized.

As noted above, the backpropagation process may be performed during training to feed the loss (e.g., the loss of the network) back through the neural network to adjust the parameters of the network (e.g., weights, biases, etc.). In some cases, derivatives of functions applied by the neural network (e.g., in the forward direction) may be used to calculate how to adjust weights based on the loss. For instance, a derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

In some examples, to train the neural network filter estimator 310 and/or the non-linear engines 322,324, a multi-resolution STFT loss $L_R$ and adversarial losses $L_G$ and $L_D$ can be computed. With respect to at least the learned linear filters 332,334 (e.g., because linear time-varying filters are fully differentiable), gradients can propagate back to the neural network filter estimator 310 during training.

Using the filter coefficients generated by the neural network filter estimator 310, the linear time-varying filter 332 can process the excitation signal y[n] generated by the neural network-based non-linear engine 322 to generate an output signal. The output signal from the linear filter 332 can be used directly to obtain the reconstructed audio signal x[n], e.g., in examples in which the optional linear post-filter

340 is not used. When the optional linear post-filter 340 is utilized, the output signal from linear filter 332 can be combined with the output signal from linear filter 334, if present, and the combined output signal(s) used an excitation signal to excite the linear post-filter 340.

The learned filters 332,334 can both be time varying linear filters. The optional post-filter 340 can be a linear filter as well, in either time varying or time invariant form. Linear filters preserve the linearit property between inp uts and outputs. For instance, a linear filter is associated with a mapping $\mathcal{L}: \mathbb{R}^{\mathbb{Z}} \rightarrow \mathbb{R}^{\mathbb{Z}}$, $x[n] \rightarrow y[n]=\mathcal{L}(x[n])$ that has the following property: for any $x_1[n]$, $x_2[n] \in \mathbb{R}^{\mathbb{Z}}$ and any a, $b \in \mathbb{R}$, $\mathcal{L}(a\, x_1[n]+b\, x_2[n])=a\, \mathcal{L}(x_1[n])+b\, \mathcal{L}(x_2[n])$. In one illustrative example, if input1 produces output1 and input2 produces output2, then a combined input of (input1+input2) will produce output=output1+output2. The time-varying nature of the linear time-varying filters 332,334 (and/or the linear post-filter 340) indicates that the filter response depends on the time of excitation of the linear filter (e.g., a new set of coefficients used to filter each frame (block of time) of input at the time of excitation). In some cases, time-varying linear filters can be characterized by the set of impulse responses at each time lag $h_k[n]=\mathcal{L}(\delta([n-k])$ for each $k \in \mathbb{Z}$. In some examples, the output of a time varying linear filter is $\mathcal{L}(x[n])=\Sigma_k x[k]*h_k[n]$ or some heuristic combination of filter input and impulse responses, e.g., overlap-add on windowed and filtered signal segments, etc.

Figure 4:
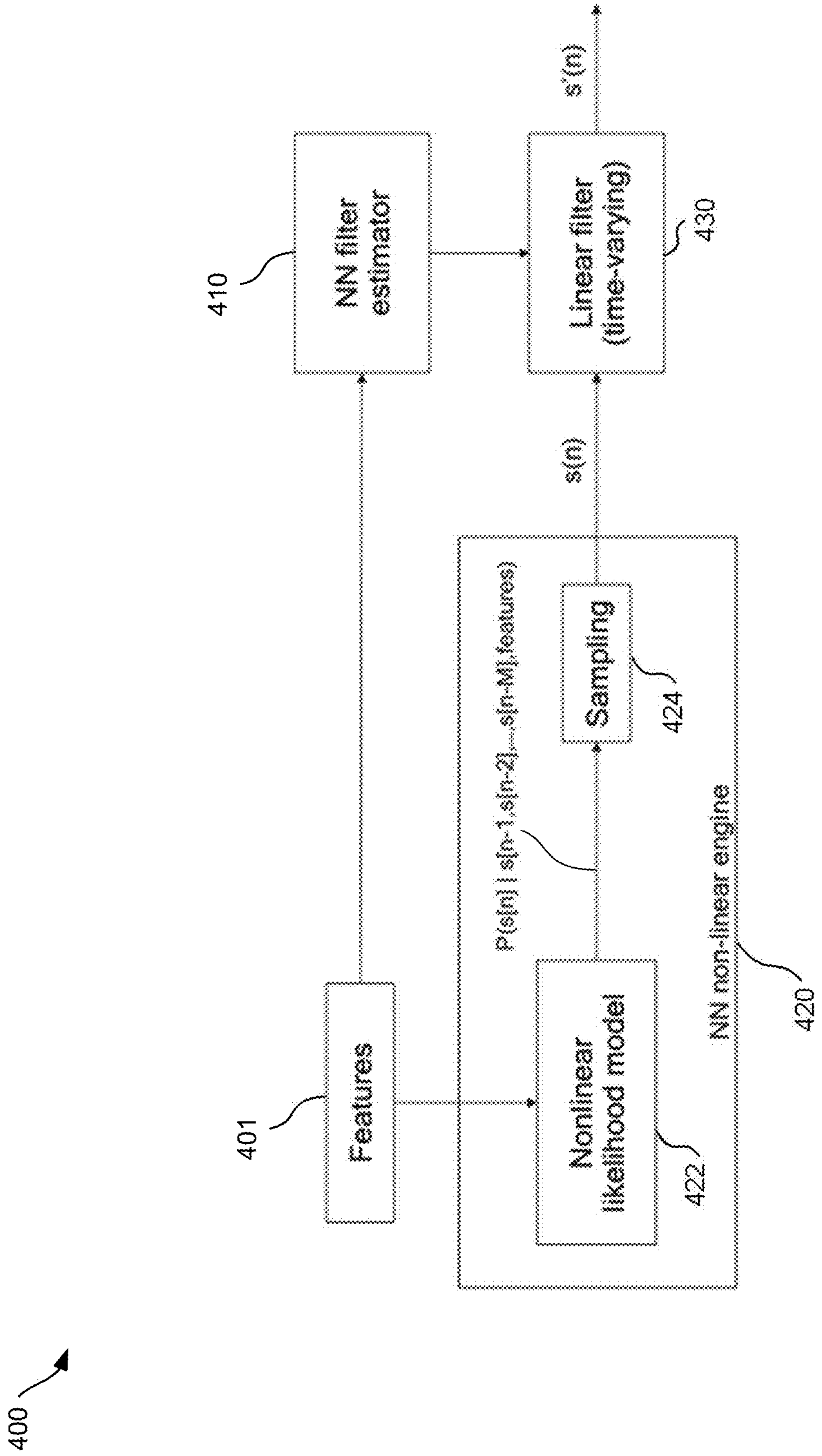
FIG. 4 is a block diagram illustrating an example of a voice coding system utilizing a linear time-varying filter generated using a neural network model and a separate neural network-based non-linear likelihood speech model, in accordance with some examples.

FIG. 4 is a diagram illustrating an example voice decoding system 400 for post-processing of a non-linear likelihood speech model 422 with a neural network-estimated linear filter 430. In some examples, the non-linear likelihood speech model 422 can be included (in combination with a sampling process 424) in a neural network-based non-linear engine 420, as illustrated in FIG. 4. In some examples, the neural network-based non-linear engine 420 can be the same as or similar to one or more of the neural network-based non-linear engines 322, 324 of FIG. 3. In some examples, the neural network filter estimator 410 and the associated time-varying, learned linear filter 430 can be the same as or similar to the neural network filter estimator 310 and the associated time-varying, learned linear filters 332,334 of FIG. 3, respectively.

A set of features 401 (which can be the same as or similar to the features 301, as described above with respect to FIG. 3) is provided as input to neural network-based non-linear engine 420. For instance, the features 401 can be input to the non-linear likelihood speech model 422, which is trained to generate a probability distribution (e.g., likelihood model) P(s[n]|s[n−1], s[n−2], . . . , s[n−M], features) The non-linear likelihood speech model 422 can be neural network-based, e.g., trained as a component of the neural network-based non-linear engine 420. In some examples, non-linear likelihood speech model 422 can be trained directly and subsequently utilized as a trained component within neural network-based non-linear engine 420, which in this case may not undergo any further or additional training itself. In some examples, the non-linear likelihood speech model 422 can be based on a Wavenet, WaveRNN, LPCNet, and/or other likelihood models. Non-linear likelihood speech model 422 can be sample-based, frame based, AR, non-AR, etc.

The output of the non-linear likelihood speech model 422 is the probability distribution P(s[n]|s[n−1], s[n−2], . . . , s[n−M], features). Because the time-varying, learned linear filter 430 operates over signals in the time domain, the neural network-based non-linear engine 420 can include a sampling process 424 to sample from the probability distribution P(s[n]|s[n−1], s[n−2], . . . , s[n−M], features) and generate a sampled signal s(n) that is in the time domain and compatible with the time-varying linear filter 430 as input. The type of output generated by the neural network-based non-linear engine 420 therefore can, in some examples, be dependent upon the nature and type of the sampling that is performed in sampling process 424. By adjusting sampling process 424, the output of neural network-based non-linear engine 420 can also be adjusted. In some examples, when the neural network-based non-linear engines described herein utilize a non-linear likelihood model or otherwise generate a probability distribution that is subsequently sampled, the neural network-based non-linear engine can provide a one-to-many output scheme, e.g., for a given input of features, multiple different outputs can be generated by or obtained from the neural network-based non-linear engine. In some cases, when the neural network-based non-linear engines described herein utilize a non-linear transform or otherwise do not sample from a probability distribution, the neural network-based non-linear engine can provide a one-to-one output scheme, e.g., for a given input of features, a single output is generated from the non-linear transform applied by the non-linear engine.

Returning to the discussion of FIG. 4, the learned linear filter 430 receives the sampled signal s(n) as input, along with an additional input of filter characterization parameters (not shown) from the neural network filter estimator 410. Based on at least these inputs, the time-varying, learned linear filter 430 generates an output signal s(n), which in some examples represents or contains the post-processing information derived from or corresponding to the non-linear likelihood speech model. In some examples, such as when the non-linear likelihood speech model 422 is based on an LPCNet model, an LPC filter (not shown) can be provided before the learned, linear filter 430. In this example, the sampled signal s(n) from the neural network-based non-linear engine 420 can be provided to the LPC filter as input, with the output of the LPC filter coupled to learned linear filter 430 as input. In some examples, the LPC filter can be provided downstream (e.g., after) of the learned linear filter 430 to receive as input the signal s'(n) that is generated by learned linear filter 430, e.g., because two linear filters in cascade commute. In examples with an LPC filter downstream of learned linear filter 430, the learned linear filter 430 can operate in the residual domain.

Figure 5:
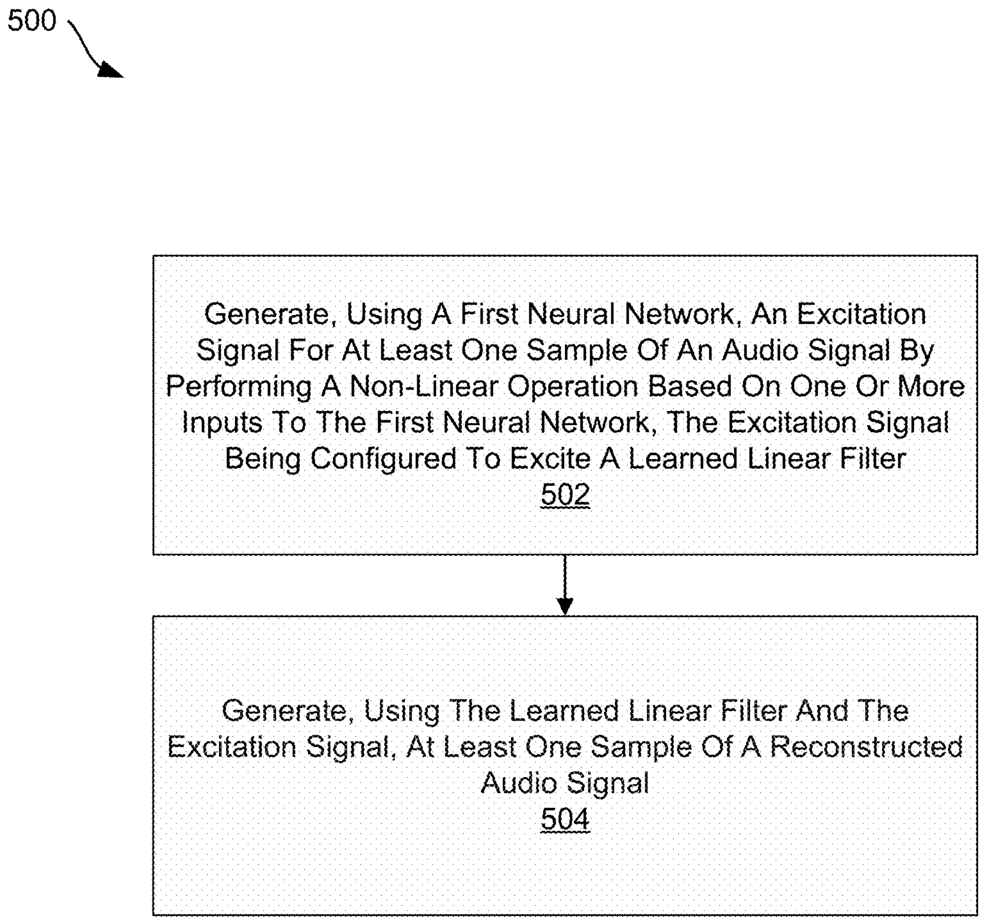
FIG. 5 is a flow chart illustrating an example of a process for reconstructing one or more audio signals, in accordance with some examples.

FIG. 5 is a flowchart illustrating an example of a process 500 for reconstructing one or more audio signals using the techniques described herein. The process 500 can be performed by an audio decoder, such as the voice coding system 300, the voice coding system 400, or any other voice decoder configured to perform the operations of process 500. The voice decoders described herein can also be used for decoding other types of audio signals other than speech, such as music signals.

At block 502, the process 500 includes generating, using a first neural network, an excitation signal for at least one sample of an audio signal by performing a non-linear operation based on one or more inputs to the first neural network. The excitation signal is configured to excite a learned linear filter. In some aspects, the learned linear filter is a time-varying filter. In some examples, one or more coefficients or parameters for characterizing the learned linear filter can be generated by a second neural network that is trained to generate linear filter coefficients from one or more feature inputs. In some examples, the one or more inputs to the first neural network include features associated with an audio signal. In some cases, the features associated with an audio signal can be provided as input to the first neural network and the second neural network. The features can include log-Mel-frequency spectrum features or other features.

At block 504, the process 500 includes generating, using the learned linear filter and the excitation signal, at least one sample of a reconstructed audio signal. In some examples, the process 500 can include using the learned linear filter and the excitation signal to general an output signal, and subsequently using a linear post-filter to generate the at least one sample of the reconstructed audio signal using at least the output of the learned linear filter.

The above-described examples described with respect to FIG. 5 can be used individually or in any combination.

In some examples, the process 500 and any other process or technique described herein may be performed by a computing device or an apparatus, such as a device (e.g., a device having the computing system 600 of FIG. 6) including the voice coding system 300, the voice coding system 400, or other voice coding system described herein. In some cases, the computing device or apparatus may include one or more input devices, one or more output devices, one or more processors, one or more microprocessors, one or more microcomputers, and/or other component(s) that is/are configured to carry out the operations of process 500. In some examples, the computing device may include a mobile device, a desktop computer, a server computer and/or server system, an extended reality (XR) device (e.g., an augmented reality (AR) device, a virtual reality (VR) device, a mixed reality (MR) device, etc.), a vehicle or a computer component or system of a vehicle, or other type of computing device.

The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display and/or a speaker (as examples of output devices), a network interface configured to communicate and/or receive data, one or more receivers, transmitters, and/or transceivers (as examples of input devices and/or output devices) configured to communicate the voice data. In some examples, the network interface, transceiver, and/or transmitter may be configured to communicate Internet Protocol (IP) based data or other network data.

The processes 500 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or any other process or technique described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
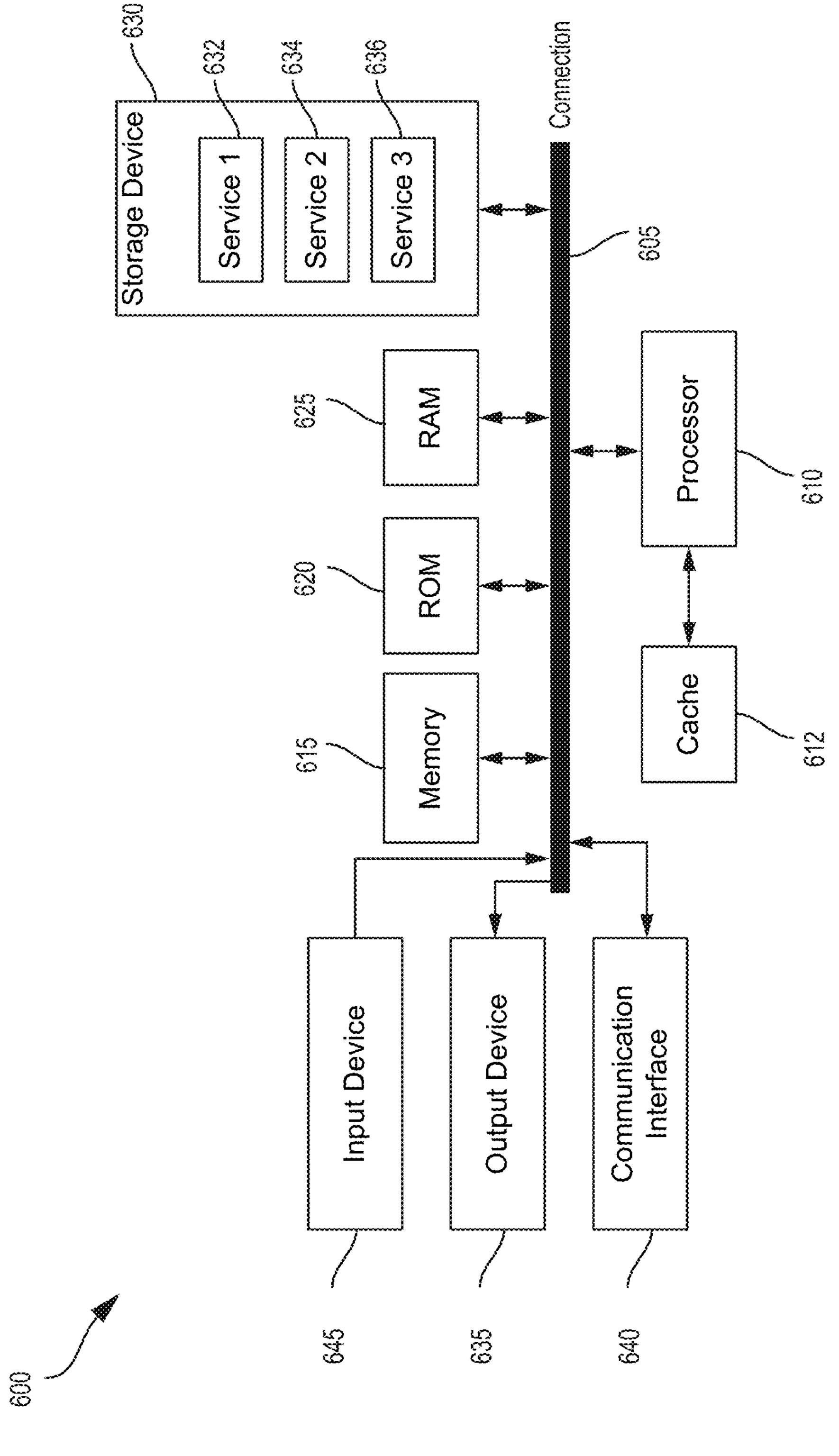
FIG. 6 is an example computing device architecture of an example computing device that can implement the various techniques described herein.

FIG. 6 shows an example of computing system 600, which can implement the various techniques described herein. For example, the computing system 600 can implement the voice coding system 300 shown in FIG. 3 or any other voice coding system described herein. The components of the computing system 600 are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache 612 of high-speed memory connected directly with, in close proximity to, or integrated as part of processor 610. In some cases, the computing system 600 can copy data from memory 615 and/or the storage device 630 to the cache 612 for quick access by processor 610. In this way, the cache can provide a performance enhancement that avoids processor 610 delays while waiting for data. These and other modules can control or be configured to control processor 610 to perform various actions. Other computing device memory 615 may be available for use as well. Memory 615 can include multiple different types of memory with different performance characteristics.

Processor 610 can include any general-purpose processor and a hardware service or software service, such as a service 1 632, a service 2 634, and a service 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art, such as a display, projector, television, speaker device, etc. In some instances, multimodal systems can enable a user to provide multiple types of input/output to communicate with computing system 600. Computing system 600 can include communication interface 640, which can generally govern and manage the user input and system output. The communication interface may perform or facilitate receipt and/or transmission of wired or wireless communications via wired and/or wireless transceivers, including those making use of an audio jack/plug, a microphone jack/plug, a universal serial bus (USB) port/plug, an Apple® Lightning@ port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc optical disc, a holographic optical disk, another optical medium, a secure digital (SD) card, a micro secure digital (microSD) card, a Memory Stick® card, a smartcard chip, a Europay Mastercard and Visa (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 630 can include software services (e.g., service 1 632, service 2 634, and service 3 636, and/or other services), servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A or B" or "one or more of A or B" means A, B, or A and B. In another example, claim language reciting "at least one of A, B, or C" or "one or more of A, B, or C" means A, B, C, or A and B, or A and C, or B and C, or A and B and C. The language "at least one of" a set and/or "one or more" of a set does not limit the set to the items listed in the set. For example, claim language reciting "at least one of A or B" or "one or more of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein.

Illustrative aspects of the disclosure include:

Aspect 1: An apparatus for reconstructing one or more audio signals, comprising: at least one memory configured to store audio data; and at least one processor coupled to the at least one memory, the at least one processor configured to: generate, using a first neural network, an excitation signal for at least one sample of an audio signal at least in part by performing a non-linear operation based on one or more inputs to the first neural network, the excitation signal being configured to excite a learned linear filter; and generate, using the learned linear filter and the excitation signal, at least one sample of a reconstructed audio signal.

Aspect 2: The apparatus of Aspect 1, wherein the one or more inputs to the neural network include features associated with the audio signal.

Aspect 3: The apparatus of Aspect 2, wherein the features include log-mel-frequency spectrum features.

Aspect 4: The apparatus of any of Aspects 1 to 3, wherein the non-linear operation performed using the first neural network is a non-linear transform.

Aspect 5: The apparatus of Aspect 4, wherein the first neural network performs the non-linear transform on the one or more inputs to the first neural network and generates the excitation signal, the excitation signal generated in a time domain.

Aspect 6: The apparatus of any of Aspects 1 to 3, wherein the non-linear operation performed using the first neural network is based on a non-linear likelihood speech model.

Aspect 7: The apparatus of Aspect 6, wherein to generate the excitation signal using the first neural network, the at least one processor is configured to: generate, using the one or more inputs to the first neural network, a probability distribution by providing the one or more inputs to the non-linear likelihood speech model; determine one or more samples from the generated probability distribution; and generate, using the one or more samples from the generated probability distribution, the excitation signal.

Aspect 8: The apparatus of any of Aspects 6 or 7, wherein the at least one processor is further configured to modify the excitation signal by modifying a sampling process used to determine the one or more samples from the generated probability distribution.

Aspect 9: The apparatus of any of Aspects 1 to 8, wherein, to generate the reconstructed audio signal using the learned linear filter, the processor is configured to: generate, using a second neural network, one or more parameters for a time-varying linear filter; parameterize the learned linear filter with the generated one or more parameters; and generate, using the parameterized learned linear filter and the excitation signal, the reconstructed audio signal.

Aspect 10: The apparatus of Aspect 9, wherein the one or more parameters for the time-varying linear filter include one or more of an impulse response, a frequency response, and one or more rational transfer function coefficients.

Aspect 11: A method of reconstructing one or more audio signals, the method comprising: generating, using a first neural network, an excitation signal for at least one sample of an audio signal at least in part by performing a non-linear operation based on one or more inputs to the first neural network, the excitation signal being configured to excite a learned linear filter; and generating, using the learned linear filter and the excitation signal, at least one sample of a reconstructed audio signal.

Aspect 12: The method of Aspect 11, wherein the one or more inputs to the neural network include features associated with the audio signal.

Aspect 13: The method of Aspect 12, wherein the features include log-mel-frequency spectrum features.

Aspect 14: The method of any of Aspects 11 to 13, wherein the non-linear operation performed using the first neural network is a non-linear transform.

Aspect 15: The method of Aspect 14, wherein the first neural network performs the non-linear transform on the one or more inputs to the first neural network and generates the excitation signal, the excitation signal generated in a time domain.

Aspect 16: The method of any of Aspects 11 to 13, wherein the non-linear operation performed using the first neural network is based on a non-linear likelihood speech model.

Aspect 17: The method of Aspect 16, wherein generating the excitation signal using the first neural network comprises: generating, using the one or more inputs to the first neural network, a probability distribution by providing the one or more inputs to the non-linear likelihood speech model; determining one or more samples from the generated probability distribution; and generating, using the one or more samples from the generated probability distribution, the excitation signal.

Aspect 18: The method of any of Aspects 16 or 17, further comprising modifying the excitation signal by modifying a sampling process used to determine the one or more samples from the generated probability distribution.

Aspect 19: The method of any of Aspects 11 to 18, wherein generating the reconstructed audio signal using the learned linear filter comprises: generating, using a second neural network, one or more parameters for a time-varying linear filter; parameterizing the learned linear filter with the generated one or more parameters; and generating, using the parameterized learned linear filter and the excitation signal, the reconstructed audio signal.

Aspect 20: The method of Aspect 19, wherein the one or more parameters for the time-varying linear filter include one or more of an impulse response, a frequency response, and one or more rational transfer function coefficients.

Aspect 21: A computer-readable storage medium storing instructions that, when executed by one or more processors, cause the one or more processors to perform operations according to any of Aspects 1 to 20.

Aspect 22: An apparatus for reconstructing one or more audio signals, comprising one or more means for performing operations according to any of Aspects 1 to 20.

What is claimed is:

1. An apparatus for reconstructing one or more audio signals, comprising:

at least one memory configured to store audio data; and at least one processor coupled to the at least one memory, the at least one processor configured to:

generate, using a first neural network, an excitation signal for at least one sample of an audio signal at least in part by performing a non-linear operation based on one or more inputs to the first neural network, the excitation signal being configured to excite a learned linear filter;

generate, using a second neural network, a parameter for the learned linear filter based on the at least one sample of the audio signal, the parameter specifying characteristics for application by the learned linear filter; and generate, using the parameter for the learned linear filter and the excitation signal, at least one sample of a reconstructed audio signal.

2. The apparatus of claim 1, wherein the one or more inputs to the first neural network include features associated with the audio signal.

3. The apparatus of claim 2, wherein the features include log-mel-frequency spectrum features.

4. The apparatus of claim 1, wherein the non-linear operation performed using the first neural network is a non-linear transform.

5. The apparatus of claim 4, wherein the first neural network is configured to perform the non-linear transform on the one or more inputs to the first neural network and to generate the excitation signal, wherein the excitation signal is generated in a time domain.

6. The apparatus of claim 1, wherein the non-linear operation performed using the first neural network is based on a non-linear likelihood speech model.

7. The apparatus of claim 6, wherein, to generate the excitation signal using the first neural network, the at least one processor is configured to:

generate, using the one or more inputs to the first neural network, a probability distribution by providing the one or more inputs to the non-linear likelihood speech model;

determine one or more samples from the generated probability distribution; and generate, using the one or more samples from the generated probability distribution, the excitation signal.

8. The apparatus of claim 7, wherein the at least one processor is further configured to modify the excitation signal by modifying a sampling process used to determine the one or more samples from the generated probability distribution.

9. The apparatus of claim 1, wherein the learned linear filter comprises a time-varying linear filter, and wherein, to generate the reconstructed audio signal using the learned linear filter, the at least one processor is configured to:

parameterize the learned linear filter with the parameter; and generate, using the parameterized learned linear filter and the excitation signal, the reconstructed audio signal.

10. The apparatus of claim 9, wherein the parameter for the time-varying linear filter includes one or more of an impulse response, a frequency response, or one or more rational transfer function coefficients.

11. A method of reconstructing one or more audio signals, the method comprising:

generating, using a first neural network, an excitation signal for at least one sample of an audio signal at least in part by performing a non-linear operation based on one or more inputs to the first neural network, the excitation signal being configured to excite a learned linear filter;

generating, using a second neural network, a parameter for the learned linear filter based on the at least one sample of the audio signal, the parameter specifying characteristics for application by the learned linear filter; and generating, using the parameter for the learned linear filter and the excitation signal, at least one sample of a reconstructed audio signal.

12. The method of claim 11, wherein the one or more inputs to the first neural network include features associated with the audio signal.

13. The method of claim 12, wherein the features include log-mel-frequency spectrum features.

14. The method of claim 11, wherein the non-linear operation performed using the first neural network is a non-linear transform.

15. The method of claim 14, wherein the first neural network performs the non-linear transform on the one or more inputs to the first neural network and generates the excitation signal, the excitation signal generated in a time domain.

16. The method of claim 11, wherein the non-linear operation performed using the first neural network is based on a non-linear likelihood speech model.

17. The method of claim 16, wherein generating the excitation signal using the first neural network comprises:

generating, using the one or more inputs to the first neural network, a probability distribution by providing the one or more inputs to the non-linear likelihood speech model;

determining one or more samples from the generated probability distribution; and generating, using the one or more samples from the generated probability distribution, the excitation signal.

18. The method of claim 17, further comprising modifying the excitation signal by modifying a sampling process used to determine the one or more samples from the generated probability distribution.

19. The method of claim 11, wherein the learned linear filter comprises a time-varying linear filter, and wherein generating the reconstructed audio signal using the learned linear filter comprises:

parameterizing the learned linear filter with the parameter; and generating, using the parameterized learned linear filter and the excitation signal, the reconstructed audio signal.

20. The method of claim 19, wherein the parameter for the time-varying linear filter includes one or more of an impulse response, a frequency response, or one or more rational transfer function coefficients.

21. A non-transitory computer-readable storage medium storing instructions that, when executed by one or more processors, cause the one or more processors to:

generate, using a first neural network, an excitation signal for at least one sample of an audio signal at least in part by performing a non-linear operation based on one or more inputs to the first neural network, the excitation signal being configured to excite a learned linear filter;

generate, using a second neural network, a parameter for the learned linear filter based on the at least one sample of the audio signal, the parameter specifying characteristics for application by the learned linear filter; and generate, using the parameter for the learned linear filter and the excitation signal, at least one sample of a reconstructed audio signal.

22. The non-transitory computer-readable storage medium of claim 21, wherein the one or more inputs to the first neural network include features associated with the audio signal.

23. The non-transitory computer-readable storage medium of claim 22, wherein the features include log-mel-frequency spectrum features.

24. The non-transitory computer-readable storage medium of claim 21, wherein the non-linear operation performed using the first neural network is a non-linear transform.

25. The non-transitory computer-readable storage medium of claim 24, wherein the first neural network performs the non-linear transform on the one or more inputs to the first neural network and generates the excitation signal, the excitation signal generated in a time domain.

26. The non-transitory computer-readable storage medium of claim 21, wherein the non-linear operation performed using the first neural network is based on a non-linear likelihood speech model.

27. The non-transitory computer-readable storage medium of claim 26, wherein, to generate the excitation signal using the first neural network, the instructions, when executed by the one or more processors, cause the one or more processors to:

generate, using the one or more inputs to the first neural network, a probability distribution by providing the one or more inputs to the non-linear likelihood speech model;

determine one or more samples from the generated probability distribution; and generate, using the one or more samples from the generated probability distribution, the excitation signal.

28. The non-transitory computer-readable storage medium of claim 27, wherein the instructions, when executed by the one or more processors, cause the one or more processors to modify the excitation signal by modifying a sampling process used to determine the one or more samples from the generated probability distribution.

29. The non-transitory computer-readable storage medium of claim 21, wherein the learned linear filter comprises a time-varying linear filter, and wherein, to generate the reconstructed audio signal using the learned linear filter, the instructions, when executed by the one or more processors, cause the one or more processors to:

parameterize the learned linear filter with the parameter; and generate, using the parameterized learned linear filter and the excitation signal, the reconstructed audio signal.

30. The non-transitory computer-readable storage medium of claim 29, wherein the parameter for the time-varying linear filter includes one or more of an impulse response, a frequency response, or one or more rational transfer function coefficients.

* * * * *